Patented Dec. 27, 1949

2,492,188

UNITED STATES PATENT OFFICE 2,492,188

CHEMICAL COMPOUNDS AND PROCESS OF PREPARING THE SAME

Lewis H. Sarett, Princeton, N. J., assignor to Merck & Co., Inc., Rahway, N. J., a corporation of New Jersey No Drawing. Application February 23, 1946, Serial No. 649,759

14 Claims. (Cl. 260—349)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ4,5-3,-11,20-triketo-17(β), 21-dihydroxy pregnene. This application is a continuation-in-part of copending application Serial No. 605,194 filed July 14, 1945, now abandoned.

This hormone is known to occur naturally in the adrenal cortex; it has the structural formula:

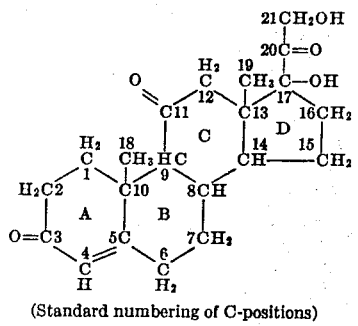

(Standard numbering of C-positions)

This formula, for purposes of convenience, is hereinafter reproduced below in the abbreviated form:

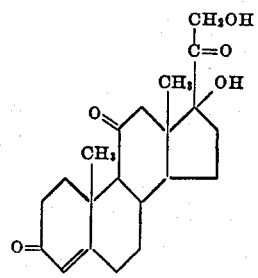

In the following description of the invention, the stereochemical relationships of substituents are indicated by the following conventions:

1. A substituent at the C–3 position which is trans to the C–10 methyl group is parenthetically designated (α).

2. A substituent at the C–17 position, the stereochemical configuration of which is identical with that of the naturally occurring adrenal hormones, is parenthetically designated (β); the epimeric configuration is designated (α). In the structural formulae the former configuration is shown by writing the C–17 substituent (hydroxyl) to the right of the C–17 carbon side chain, thus

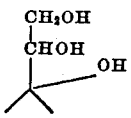

in the latter case above the side chain, thus

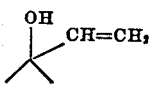

3. The stereochemical relationship of rings A and B is indicated in the formulae by a solid line representing the valence bond in the cis configuration.

In accordance with the present invention it is now found this hormone can be synthesized by reactions indicated as follows:

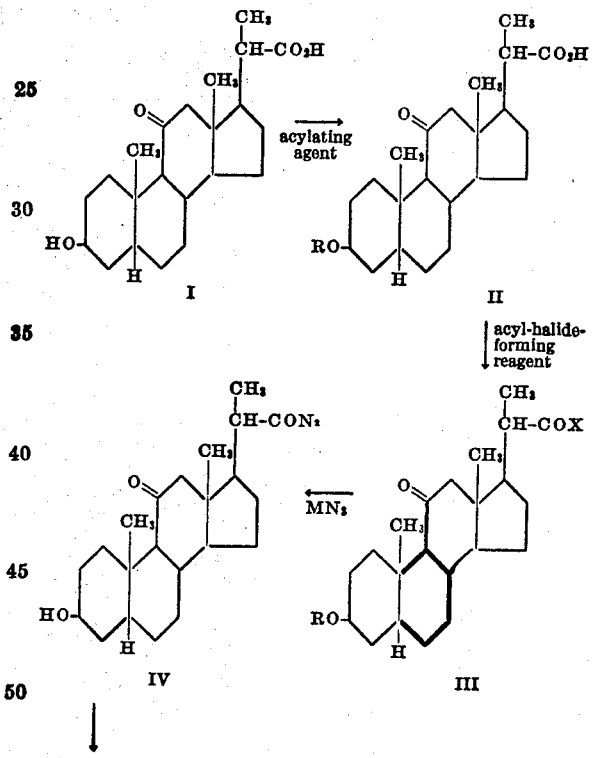

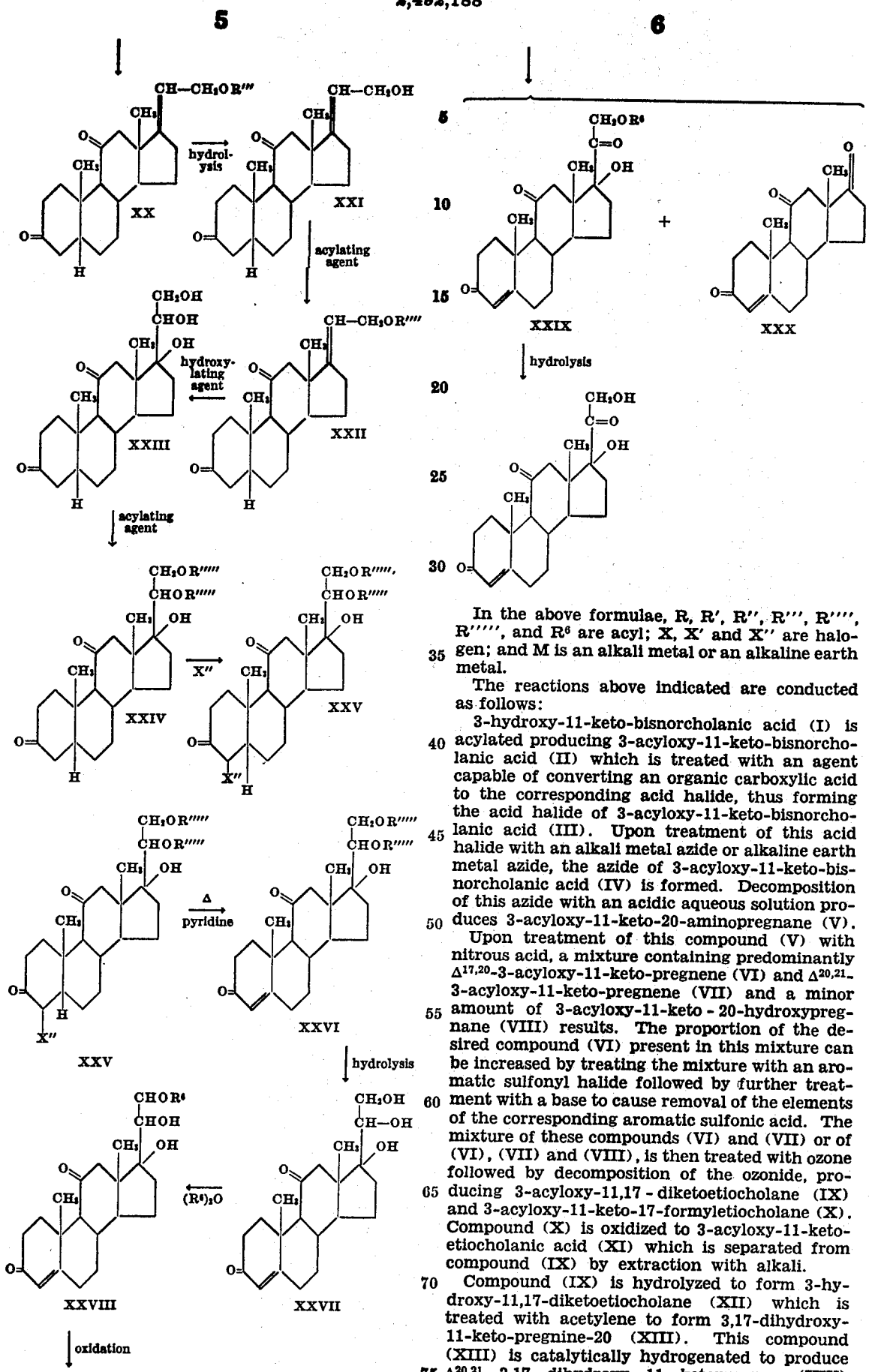

In the above formulae, R, R', R'', R''', R'''', R''''', and R⁶ are acyl; X, X' and X'' are halogen; and M is an alkali metal or an alkaline earth metal.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-keto-etiocholanic acid (XI) which is separated from compound (IX) by extraction with alkali.

Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy-11-ketopregnene (XIV)

which is acylated to form Δ²⁰,²¹-3-acyloxy-17-hydroxy-11-ketopregnene (XV), and this compound is halogenated to produce Δ¹⁷,²⁰-3-acyloxy-11-keto-21-halopregnene (XVI). When treated with an alkali metal salt or alkaline earth metal salt of an organic acid, this compound yields Δ¹⁷,²⁰ - 3,21 - diacyloxy - 11 - ketopregnene (XVII) which is hydrolyzed producing Δ¹⁷,²⁰-3,21-dihydroxy - 11 - ketopregnene (XVIII). The latter product (XVIII) is partially esterified and the mono ester (XIX) thus produced is oxidized to convert the unesterified hydroxy group in the 3 position to a keto group, thereby yielding the ester of Δ¹⁷,²⁰-3,11-diketo-21 - acyloxy - pregnene (XX). This product (XX) is hydrolyzed and the Δ¹⁷,²⁰-3,11 - diketo - 21 - hydroxypregnene (XXI) thus formed is acylated producing Δ¹⁷,²⁰-3,11-diketo-21-acyloxypregnene (XXII). Hydroxylation at the unsaturation of the last mentioned compound (XXII) results in the production of 3,11 - diketo - 17(β),20,21 - trihydroxypregnene (XXIII) which is then acylated to form 3,11-diketo-17(β) - hydroxy - 20,21-diacyloxypregnene (XXIV). When bromiated, this compound yields 3,11-diketo-4-bromo-17(β)-hydroxy-20,21-diacyloxypregnene (XXV).

This compound is then treated with a reagent capable of removing the elements of hydrogen bromide, thereby producing Δ⁴,⁵-3,11-diketo-17-(β)-hydroxy-20,21 - diacyloxypregnene (XXVI) which on hydrolysis forms Δ⁴,⁵-3,11-diketo-17-(β),20,21-trihydroxypregnene (XXVII). Partial acylation of this compound (XXVII) gives Δ⁴,⁵-3,11 - diketo-17(β),20-dihydroxy-21-acyloxypregnene (XXVIII) which, when oxidized, yields a mixture of Δ⁴,⁵-3,11,20-triketo-17(β)-hydroxy-21-acyloxypregnene (XXIX) and Δ⁴,⁵-3,11,17-triketo androstene (XXX). Compounds (XXIX) and (XXX) may be separated by conventional operations, for example chromatography, and compound (XXIX) hydrolyzed to produce the desired adrenal hormone, Δ⁴,⁵-3,11,20-triketo-17-(β),21-dihydroxypregnene.

The present invention is concerned with compounds having basic structural formulae of the type illustrated by intermediates I through V above, i. e., compounds represented by the formula:

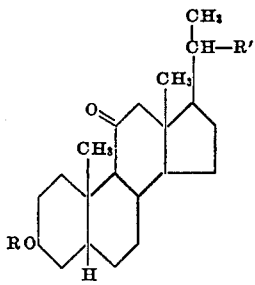

wherein R is hydrogen or an acyl group and R' is of the class consisting of amino, acylamino, carboxy, carboxyhalo and carboxytriazo. The invention also embraces processes for the preparation of compounds of the class above defined.

In accordance with the present invention, 3-hydroxy-11-ketobisnorcholanic acid, which can be obtained by alkali treatment of the methyl ester of 3-acetoxy-11-ketobisnorcholanic acid (for preparation see present inventor's copending application, Serial No. 605,194, filed July 14, 1945, now abandoned, or Helv. Chim. Acta 27, 713 (1944)), is treated with an acylating agent, for example an organic acid or acid anhydride, whereby acylation of the 3-hydroxy substituent is effected. For this purpose preferably the lower aliphatic carboxylic acids (i. e., those having 6 carbon atoms or less) or their anhydrides may be employed, for example acetic acid, acetic anhydride, propionic acid, propionic anhydride, butyric acid, butyric anhydride, valeric acid, valeric anhydride, and also though less desirable for this purpose, caproic acid, capric acid, benzoic acid, toluic acid and phenylacetic acid. The product obtained in each particular instance depends upon the acylating agent employed, for example acetic acid or its anhydride yields 3-acetoxy compounds, propionic acid or its anhydride yields 3-propionoxy compounds, etc. The 3-acyloxy-11-ketobisnorcholanic acid thus obtained is then treated with a reagent capable of converting a carboxylic acid to the corresponding carboxylic acid halide, for example a thionyl halide (preferably thionyl chloride), a phosphorous trihalide such as phosphorous tribromide or phosphorous trichloride, or a phosphorous pentahalide such as phosphorous pentachloride. The product obtained by this treatment, depending upon the starting material and reagent selected, is a 3-acyloxy-11-ketobisnorcholanic acid halide, for instance reaction of 3-acetoxy-11-ketobisnorcholanic acid with thionyl chloride yields 3-acetoxy-11-ketobisnorcholanic acid chloride. The compound thus obtained is then reacted with an azide in a solvent inert to the reactants, for example acetone, to yield the acid azide as a result of replacement of the halogen atom of the acid halide with an azide group. In performing this reaction, sodium azide is preferred although if desired other azides can be employed, for example alkali metal azides, alkaline earth metal azides or other readily available salts of hydrazoic acid.

The product thus obtained, i. e., the 3-acyloxy-11-ketobisnorcholanic acid azide, is treated with an aqueous acid solution, preferably dilute acetic acid although solutions of other organic or inorganic acids can be used satisfactorily, at a slightly elevated temperature, for instance at 50°–100° C., thereby causing decomposition of the azide and formation of the corresponding 3-acyloxy-11-keto-20-aminopregnane which is obtained as a salt. Mild treatment of this salt with alkali liberates the free base, 3-acyloxy-11-keto-20-aminopregnane; further treatment with alkali under saponification conditions yields 3-hydroxy-11-keto-20-aminopregnane (M. P. 185–186° C.). When reacted with an acylating agent under conditions usual for the conversion of an amino compound to the corresponding acylamino compound, the 3-acyloxy-11-keto-20-aminopregnane compounds yield the corresponding 3-acyloxy-11-keto-20-acylaminopregnanes For example, treatment of 3-acetoxy-11-keto-20-aminopregnane, or a salt thereof, with acetyl chloride or acetic anhydride in the presence of pyridine yields 3-acetoxy-11-keto - 20 - acetylaminopregnane.

The following example of the practice of the instant invention is provided by way of illustration, not of limitation.

*Example*

3 - (a) - hydroxy - 11 - ketobisnorcholanic acid (I).—A solution of 1.0 g. of methyl 3-(a)-acetoxy-11 ketobisnorcholanate, which may be obtained as described in Helv. Chim. Acta 27, 713 (1944), in about 25 cc. of 2N potassium hydroxide-75% methanol mixture was refluxed overnight. Most of the methanol was removed in vacuo, the solution was diluted with water and acidified with dilute hydrochloric acid, and the amorphous precipitate which formed was removed by filtration, washed and dried. This product was 3-(α)-hydroxy-11-ketobisnorcholanic acid, M. P. ca. 195° C. (223-225° C. corr.). This treatment may be applied to other esters of 3-acyloxy-11-ketobisnorcholanic acids to obtain the same product above described.

3 - (α) - *acetoxy - 11 - ketobisnorcholanic acid (II)*.—A solution of 3.0 g. of 3-(α)-hydroxy-11-ketobisnorcholanic acid in about 100 cc. of glacial acetic acid was refluxed overnight, then the solution was concentrated in vacuo to a volume of about 30 cc., warmed and small amounts of water were added until crystallization began. The mixture was then chilled at about 0° C. overnight and the product which had separated was removed by filtration and dried. This crude product (M. P. 239°-250° C.) was purified by several recrystallizations from dilute acetone to yield the final product, 3-(α)-acetoxy-11-ketobisnorcholanic acid (M. P. 249°-254° C.). In like manner other 3-acyloxy-11-ketobisnorcholanic acids may be prepared by substituting different acylating agents for the acetic acid employed in this procedure. For instance acetic anhydride yields the 3-acetoxy compound; propionic anhydride, the 3-propionoxy derivative; the 3-benzoxy compound may be obtained by use of a benzoyl halide and pyridine, etc.

*3-(α)-acetoxy-11-ketobisnorcholanic acid chloride (III)*.—About 30.0 g. of 3-(α)-acetoxy-11-ketobisnorcholanic acid were dissolved in 45 cc. of purified thionyl chloride and this solution, after standing about 90 minutes at room temperature, was warmed at 45° C. for 30 minutes, then concentrated to dryness in vacuo. The residue was dissolved in about 45 cc. of warm absolute toluene and the toluene was then removed by distillation in vacuo, the residue being the desired product, 3-acetoxy-11-ketobisnorcholanic acid chloride (M. P. 140°-144° C.). It will be understood that other compounds of this type having different 3-position substituents of the class acyloxy, i. e. 3-propionoxy compounds, 3-benoxy compounds, etc., may be prepared by selecting and using a corresponding 3-acyloxy-11-ketobisnorcholanic acid as starting material, i. e., 3-propionoxy-11-ketobisnorcholanic acid, 3-benzoxy-11-keto-bisnorcholanic acid, etc. Likewise different halides can be obtained and/or other reagents capable of converting a carboxylic acid to a carboxylic acid halide may be employed in this procedure by substituting for the thionyl chloride a reagent such as other thionyl halides, a phosphorous trihalide or a phosphorous pentahalide.

3 - (α) - *acetoxy-11-ketobisnorcholanic acid azide (IV)*.—The 3-(α)-acetoxy-11-ketobisnorcholanic acid chloride obtained as above described was dissolved in about 200 cc. of dry acetone at 5°-10° C., the solution was cooled to about 0° C. and a solution of 12.0 g. of sodium azide in 30 cc. of water was added. After about 5 minutes, during which the mixture was agitated and cooled in an ice bath, about 700 cc. of ice water was added slowly and the product, which separated as an apparently crystalline precipitate, was removed by filtration. This product, 3-(α)-acetoxy-11-ketobisnorcholanic acid azide, was found to be reasonably stable at temperatures below about 40° C. while moist but when dried it decomposed at room temperature. It will be understood that this procedure may be modified by substituting other 3-acyloxy compounds for the 3-acetoxy compound about utilized, in which instances correspondingly substituted products may be obtained, also instead of sodium azide other readily available salts of hydrozoic can be employed, for instance other alkali metal azides, alkaline earth metal azides and the like.

3 - (α) - *acetoxy-11-keto-20-aminopregnane (V)*.—The 3-(α)-acetoxy-11-ketobisnorcholanic acid azide obtained as above described was dissolved in 300 cc. of glacial acetic acid and, as the solution was warmed on a steam bath, about 200 cc. of water was added slowly, after which the solution was heated at approximately 90° C. for about 30 minutes to complete the decomposition of the acid azide. At this stage the solution contained the acetate of 3-(α)-acetoxy-11-keto-20-aminopregnane. This solution as then cooled in an ice-salt bath, about 100 cc. of benzene was added, then while the mixture was agitated, a cold solution of 425 g. of potassium hydroxide in 700 cc. of water was slowly added, the temperature of the mixture being maintained throughout at 10° C. or lower to minimize saponification of the 3-position substituent, then the mixture was treated with ether, thereby diluting the benzene layer, and a precipitate which separated at the interface was removed, dissolved in water, filtered to separate a residue, and filtrate was carefully neutralized with acid to yield a precipitate identified as crude potassium 3-(α)-acetoxy-11 - ketobisnorcholanate. The water-insoluble residue was identified as 3-(α)-keto-hydroxy-11-keto-20-aminopregnane (M. P. 185°-186° C.). The ether-benzene layer was separated, concentrated to dryness in vacuo to yield a residue which was dissolved in about 100 cc. of absolute ether, and this solution after chilling, standing and filtering, yielded the crude crystalline product, 3-(α) - acetoxy-11-keto-20-aminopregnane. This crude material was purified by recrystallization from absolute ether to obtain the final product (M. P. 163.5°-165.5°). It will be understood that the foregoing procedure can be applied to analogous compounds having different 3-position substituents within the class acyloxy, and that when so modified, the products obtained are analogous to those above described but with corresponding 3-position substituents. It will also be understood that the acid azide may be decomposed to the amino compound by heating with aqueous solutions of other acids, either inorganic acids or organic acids, instead of the acetic acid employed in the procedure above described.

*3-(α)-acetoxy - 11 - keto-20-acetylaminopregnane and 3 - (α)-hydroxy-11-keto-20-acetylaminopregnane*.—Treatment of either 3-(α)-hydroxy-11-keto-20-aminopregnane or 3-(α)-acetoxy-11-keto-20-aminopregnane with acetic anhydride and pyridine yielded a product identified as 3 - (α)-acetoxy-11-keto-20-acetylaminopregnane (M. P. 235° C.) which, upon saponification with alkali, gave 3-(α)-hydroxy-11-keto-20-acetylaminopregnane (M. P. 219.5° C.). It will be understood that other compounds within the classes of 3-acyloxy-11-keto-20-acylaminopregnanes and 3-hydroxy-11-keto-20-acylaminopregnanes may be prepared by selecting a differently 3-substituted compound as a starting material and/or by substituting a different acylating agent for the acetic anhydride pyridine used in the procedure above described.

It will be apparent that in the foregoing processes reasonable variations may be made in operating conditions, i. e., reaction temperatures, relative proportions of reactants, proportions and types of solvents employed, etc., without departure from the scope and substance of the instant invention.

What is claimed is:

1. 3-hydroxy-11-keto-20-aminopregnane.
2. 3-acetoxy-11-keto-20-aminopregnane.
3. 3-acetoxy-11-ketobisnorcholanic acid azide.
4. The process that comprises treating 3-hydroxy-11-ketobisnorchlolanic acid with a lower aliphatic acylating agent to produce 3-acyloxy-11-ketobisnorcholanic acid, treating this 3-acyloxy compound with a halogenating agent to produce the corresponding acid halide, reacting this acid halide with a metal azide to produce the corresponding azide, decomposing the azide thus obtained by heating in the presence of an aqueous acid to form 3-acyloxy-11-keto-20-aminopregnane and saponifying said amino pregnane with alkali to yield 3-hydroxy-11-keto-20-amino pregnane.
5. The process that comprises treating 3-hydroxy-11-ketobisnorcholanic acid with acetic acid to produce 3-acyloxy-11-ketobisnorcholanic acid, treating this 3-acyloxy compound with thionyl chloride to produce the corresponding acid halide, reacting this acid halide with sodium azide to produce the corresponding azide, and decomposing the azide thus obtained by heating in the presence of an aqueous acid to form 3-acyloxy-11-keto-20-aminopregnane.
6. The process that comprises treating a 3-lower aliphatic acyloxy-11-ketobisnorcholanic acid halide with an azide and recovering 3-lower aliphatic acyloxy-11-ketobisnorcholanic acid azide.
7. The process that comprises treating a 3-acetoxy-11-ketobisnorcholanic acid halide with an azide and recovering 3-acetoxy-11-ketobisnorcholanic acid azide.
8. The process that comprises treating 3-acetoxy-11-ketobisnorcholanic acid chloride with an azide and recovering 3-acetoxy-11-ketobisnorcholanic acid azide.
9. The process that comprises treating 3-acetoxy-11-ketobisnorcholanic acid chloride with an alkali metal azide and recovering 3-acetoxy-11-ketobisnorcholanic acid azide.
10. The process that comprises treating 3-acetoxy-11-ketobisnorcholanic acid chloride with sodium azide and recovering 3-acetoxy-11-ketobisnorcholanic acid azide.
11. The process that comprises decomposing by heating in dilute aqueous acid 3-lower aliphatic acyloxy-11-ketobisnorcholanic acid azide and recovering 3-lower aliphatic acyloxy-11-keto-20-aminopregnane.
12. The process that comprises decomposing by heating in dilute aqueous acid 3-acetoxy-11-ketobisnorcholanic acid azide and recovering 3-acetoxy-11-keto-20-aminopregnane.
13. The process that comprises decomposing by heating in dilute aqueous acetic acid 3-lower aliphatic acyloxy-11-ketobisnorcholanic acid azide and recovering 3-lower aliphatic acyloxy-11-keto-20-amino-pregnane.
14. The process that comprises decomposing by heating in dilute aqueous acetic acid 3-acetoxy-11-ketobisnorcholanic acid azide and recovering 3-acetoxy-11-keto-20-aminopregnane.

LEWIS H. SARETT.

REFERENCES CITED

The following references are of record in the file of this patent:

UNITED STATES PATENTS

| Number | Name | Date |
|---|---|---|
| 2,254,562 | Bockmuhl | Sept. 2, 1941 |

OTHER REFERENCES

Lardon et al., Helv. Chim. Acta, 27, 715, 724, May 2, 1944.